(12) United States Patent
Collins et al.

(10) Patent No.: US 7,137,263 B2
(45) Date of Patent: Nov. 21, 2006

(54) LOW PROFILE CONDENSER MOTOR

(75) Inventors: Michael T Collins, St. Louis, MO (US); Ralph D Furmanek, Wildwood, MO (US); S. Duke Snider, St. Louis, MO (US)

(73) Assignee: Emerson Electric Co., St. Louis, MO (US)

( * ) Notice: Subject to any disclaimer, the term of this patent is extended or adjusted under 35 U.S.C. 154(b) by 217 days.

(21) Appl. No.: 10/771,208

(22) Filed: Feb. 2, 2004

(65) Prior Publication Data

US 2005/0166630 A1    Aug. 4, 2005

(51) Int. Cl.
*F25D 17/00* (2006.01)
*F25B 39/04* (2006.01)

(52) U.S. Cl. ............................ 62/180; 62/181; 62/507

(58) Field of Classification Search .................. 62/180, 62/181, 507
See application file for complete search history.

(56) References Cited

U.S. PATENT DOCUMENTS

| | | | | |
|---|---|---|---|---|
| 3,931,535 A | * | 1/1976 | Roesel, Jr. .................. | 310/113 |
| 4,612,468 A | * | 9/1986 | Sturm et al. ............... | 310/67 R |
| 4,731,554 A | * | 3/1988 | Hall et al. ................. | 310/67 R |
| 4,763,037 A | * | 8/1988 | Hashimoto et al. ......... | 310/268 |
| 5,117,656 A | * | 6/1992 | Keck et al. .................... | 62/506 |
| 5,883,449 A | * | 3/1999 | Mehta et al. .............. | 310/60 R |
| 6,404,086 B1 | * | 6/2002 | Fukasaku et al. ............. | 310/89 |

OTHER PUBLICATIONS

"Motor Design, Quality and Performance are Critical to Reliable Operation of Fans & Blowers", ebm Industries, Inc. 1995, 1996, 1997, 1999, pp. 15-23.
Web site: http://www.ebmpapst.us/about/about.htm, "ebmpapst", ebm-papst Inc. 2003, Legal Info :: Site map, 2 pages.
Web site: http://www.ebmpapst.us/News/prs1.htm, Press Releases, ebm-papst Inc. 2003, Legal Info :: Site map, 1 page.

* cited by examiner

*Primary Examiner*—Cheryl Tyler
*Assistant Examiner*—B. Clayton McGraw
(74) *Attorney, Agent, or Firm*—Harness, Dickey & Pierce, P.L.C.

(57) ABSTRACT

An air conditioning (A/C) system includes a condenser and an electric motor that drives a fan to induce air flow through the condenser. The electric motor includes an internal stator assembly and an external rotor assembly rotatable about the internal stator assembly. A housing is attached to the external rotor assembly. The fan is connected to the housing.

20 Claims, 6 Drawing Sheets

LOW PROFILE CONDENSER MOTOR

FIELD OF THE INVENTION

The present invention relates to condensing units of air-conditioning (A/C) systems, and more particularly to a low profile condenser motor for a condensing unit of an A/C system.

BACKGROUND OF THE INVENTION

Air conditioning (A/C) systems provide cool air that is circulated in buildings. A/C systems are thermo-dynamic devices with a cold side and a hot side. Refrigerant is circulated in the A/C system and undergoes gas-liquid and liquid-gas state changes that enable cooling of air. The hot side of the A/C system induces a state change in the refrigerant from a gas to a liquid state by transferring heat from the refrigerant to atmosphere. The cold side of the A/C system induces a state change in the refrigerant from a liquid to a gas state by transferring heat from ambient air within the building to the refrigerant. The heat transfer from the ambient air to the refrigerant cools the ambient air in the building.

The cold side of the A/C system is located within the building to cool ambient air within the building. The cooled air is circulated through the building by an air handler, such as a furnace and a blower. The hot side of the A/C system is located external to the building and includes a condensing unit.

The condensing unit typically includes a compressor, a condensing coil, a fan blade, and an electric motor. The compressor compresses and moves the refrigerant in the condensing coil. The electric motor rotates the fan blade to induce air flow through the condensing unit. The air flow improves heat transfer of the refrigerant in the condensing coil and improves condenser efficiency.

Typically, the electric motor of the condensing unit is a permanent split capacitor (PSC) motor that includes an inner rotor that rotates within an outer stator. The PSC motor also includes a shell and two stationary end shields. The PSC motor is mounted in a shaft downward position from the top of a housing containing the condensing unit. The electric motor rotates the fan to induce upward air flow through the condensing unit.

The housing for the condensing unit typically has a defined height. Due to their construction, conventional PSC motors are longer in an axial direction than desired. When the motor is mounted in the shaft downward position, the fan blades are located a significant distance from the top of the condensing coil assembly. In other words, a top portion of the condensing coil lies above the fan. The top portion of the condensing coil that is at or above the height of the fan blade does not receive air flow and has a lower heat transfer efficiency. In some condensing units, the electric motor is mounted in a shaft upward position to improve the condensing unit efficiency. This approach increases the cost of both the motor and the condensing unit.

Performance attributes of AC systems can be improved in several areas. AC systems generate undesirable acoustic noise during operation due to the operation of the fan and/or the compressor. Some of the acoustic noise that is created by the fan can be attributed to the electric motor. In other words, reducing acoustic noise of the PSC motors would decrease the acoustic noise of the AC system.

AC systems also consume a relatively high amount of power due to the operation of the electric motor and/or compressor. Reducing the "on" time of the fan by increasing the efficiency of the condensing unit would be desirable. Furthermore, reducing the power that is dissipated by the electric motor would also be desirable.

SUMMARY OF THE INVENTION

A condensing unit for an air conditioning (A/C) system according to the present invention includes a condensing coil and a fan including fan blades. An electric motor rotates the fan to induce air flow through the condensing coil. The electric motor comprises a stator assembly, a rotor assembly that rotates radially outside of the stator assembly, and a rotor endshield that is attached to and rotates with the rotor assembly. The fan is directly connected to the rotor endshield.

In other features, the stator assembly includes single-phase windings. The single-phase windings define 6 poles. The rotor assembly includes rotor bars. The fan and/or the fan blades are connected to the rotor endshield.

In other features, the rotor endshield forms a non-contact seal with a stator housing. The rotor endshield is ventless.

A condensing unit for an air conditioning (A/C) system according to the present invention comprises a condensing coil, a fan including fan blades and an electric motor that rotates the fan to induce air flow through the condensing coil. The electric motor comprises an internal stator assembly, an external rotor assembly rotatable about the internal stator assembly, and a shaft that rotates with the external rotor assembly and that is connected to the fan.

In other features, the internal stator assembly includes single-phase windings. The single-phase windings define 6 poles. The external rotor assembly includes rotor bars. A rotor endshield is attached to and rotates with the external rotor assembly. The fan is connected to the rotor endshield.

In still other features, bearings having an outer race that contacts the internal stator assembly and an inner race that contacts the shaft. A collar connects the shaft and the rotor endshield. The rotor endshield forms a non-contact seal with a stator housing. The rotor endshield is enclosed.

A condensing unit for an air conditioning (A/C) system according to the present invention comprises a condensing coil, a fan, and an electric motor that rotates the fan to induce air flow through the condensing coil. The electric motor comprises an internal stator assembly including a stator housing, and an external rotor assembly that rotates relative to the internal stator assembly and that includes an enclosed rotor endshield having a radial edge that forms a non-contact seal with a corresponding edge of the stator housing.

In other features, the internal stator assembly includes single-phase windings. The single-phase windings define 6 poles. The external rotor assembly includes rotor bars. The fan is connected to the enclosed rotor endshield. The fan comprises a plurality of fan blades. A shaft is fixed for rotation with and extends from the ventless rotor endshield. The fan is attached to the shaft.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses. For purposes of clarity, the same reference numbers will be used in the drawings to identify similar elements.

Figure 1:
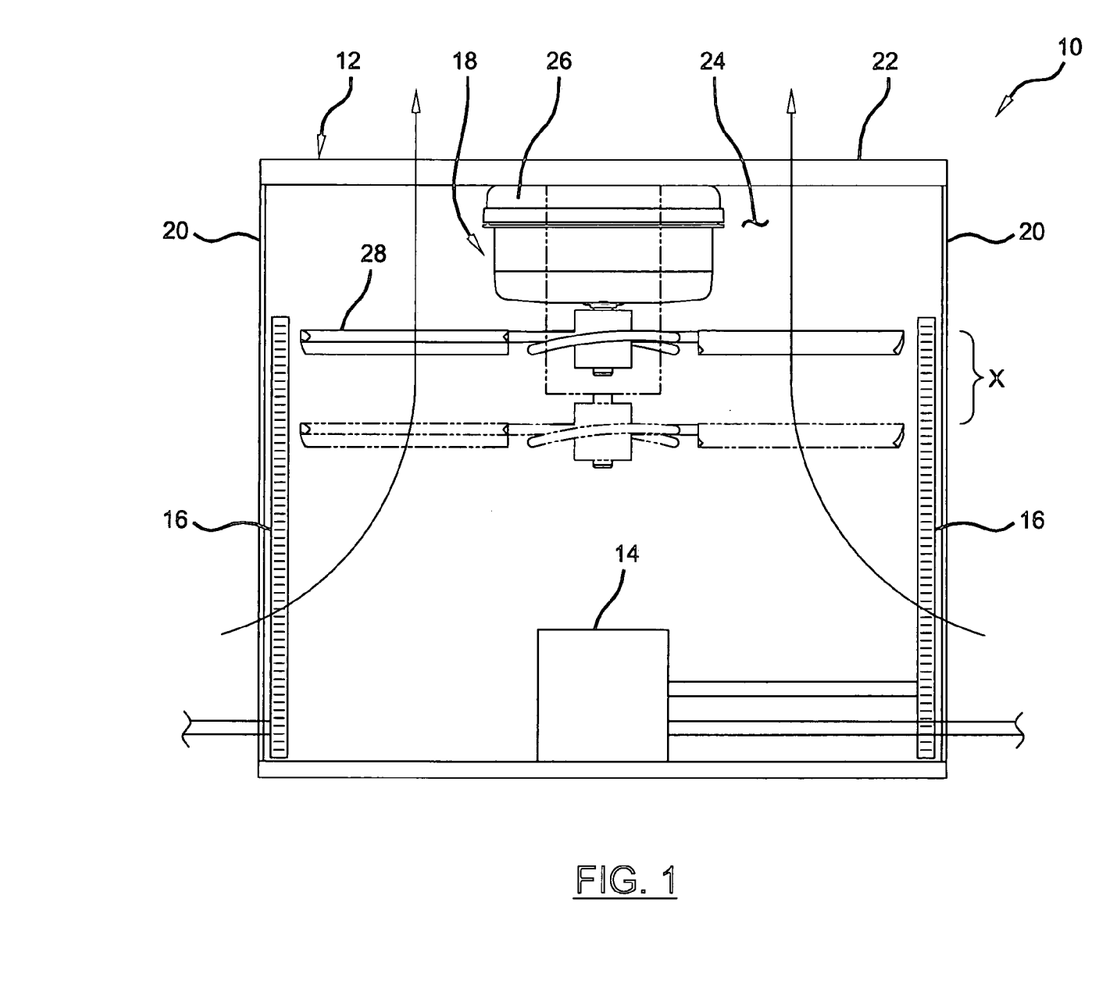
FIG. 1 is a partial cross-section of a split-system air-conditioner (A/C) including a low profile electric motor according to the present invention.

Referring now to FIG. 1, a partial cross-section of an air-conditioning (A/C) system 10 is shown. The A/C system 10 is a split-system with a hot side and a cold side, as explained in further detail below. The A/C system 10 is generally used to cool buildings such as, but not limited to, a residential home, an office building, or a factory. The A/C system 10 cools ambient air within the building and produces air flow through the building. The A/C system 10 regulates the internal temperature of the building by circulating cool air in the building.

The cold side (not shown) of the A/C system 10 includes an expansion valve and cold coil or evaporator. The hot side of the A/C system 10 includes a condensing unit 12. The condensing unit 12 includes a compressor 14, a condensing coil 16 and a fan blade and motor assembly 18. The condensing unit 12 is remote from the environment that is to be cooled, and is generally located external to the building. The cold side of the A/C system 10 is disposed within an air handler (not shown) such as a furnace with a blower.

The compressor 14 compresses gaseous refrigerant, which increases the pressure and temperature of the gaseous refrigerant. The gaseous refrigerant flows from the compressor 14 through the condensing coil 16. As the gaseous refrigerant flows through the condensing coil 16, heat transfer occurs, whereby heat from the gaseous refrigerant is dissipated to the atmosphere surrounding the condensing unit 12. The fan and motor assembly 18 draws air through the condensing coil to improve the heat transfer process. The heat transfer lowers the temperature of the gaseous refrigerant. When the refrigerant temperature decreases below the saturated vapor phase, a state change occurs. More specifically, the gaseous refrigerant changes from the gaseous refrigerant to a lower temperature liquid refrigerant.

The liquid refrigerant from the condensing coil 16 flows into the building to the cold side of the A/C system 10. More specifically, the liquid refrigerant flows through the expansion valve, which decreases the pressure of the liquid refrigerant. The lower pressure liquid refrigerant flows into the evaporator. The evaporator enables heat transfer from the ambient air circulated by the air handling device to the liquid refrigerant flowing therethrough. As heat is transferred from the ambient air to the liquid refrigerant, the temperature of the ambient air decreases and the liquid refrigerant temperature increases. As the liquid refrigerant temperature increases, a boiling point is achieved and a state change occurs. More specifically, the liquid refrigerant changes to a higher temperature gaseous refrigerant. The gaseous refrigerant flows back to the condensing unit 12 to be re-circulated through the A/C system 10.

The condensing unit 12 includes a side wall 20 that defines a three-dimensional structure that has a cross-section such as but not limited to a circle, a square, a rectangle, an ellipse, or other suitable shapes. The side wall 20 supports the condenser 16 therein and includes an open-mesh structure that enables air flow (illustrated as arrows in FIG. 1). The condensing unit 12 also includes a top 22 that is also an open-mesh structure that enables air flow. The condensing coil 16 forms a three-dimensional structure that has the same general cross-sectional shape as the side wall 20. The compressor 14 and fan and motor assembly 18 are disposed within an interior space 24 and are physically protected from large debris by the condensing coil 16 and the side wall 20. A screen (not shown) may also be provided. The fan and motor assembly 18 is attached to and hangs down into the interior space 24 from the top 22. The condensing coil 16 includes heat transfer surfaces, such as fins, extending therefrom. Air flow through the fins improves the transfer of heat from the air to the gaseous refrigerant.

The fan and motor assembly 18 produces air flow (indicated by the arrows) through the condensing coil 16. The fan and motor assembly 18 includes a low profile electric motor 26 and a fan blade 28. The low profile electric motor 26 drives the fan blade 28, which produces air flow through the condensing coil 16. The position of the fan blade 28 relative to the height of the condensing coil 16 influences the condenser unit efficiency. As the fan blade 28 is positioned lower along the height of the condensing coil 16, the total air flow through the condensing coil 16 is decreased. For example, the fan position using a traditional electric motor (shown in phantom) is lower than the fan position using the low profile electric motor 26 of the present invention by the distance (X). Accordingly, air flow through the upper section (X) of the condensing coil 16 is much lower for the traditional electric motor than for the low profile electric motor 26. As a result, the condenser efficiency is improved using the low profile electric motor 26 because forced air flow is provided through a much greater height of the condensing coil 16.

Referring now to FIGS. 2 through 6, the low profile electric motor 26 is preferably a permanent split-capacitor (PSC) motor. In one implementation, the electric motor 26 is a single-phase, six-pole, brushless AC induction electric motor. The low profile electric motor 26 includes a stator housing 30, a stator assembly 32, a rotor housing or endshield 34, a rotor assembly 36 and a shaft 38. As explained in further detail below, the low profile electric motor 26 is configured as an inside-out type electric motor. In other words, the stator assembly 32 is internal to the rotor assembly 36, which rotates about the stator assembly 32.

Figure 2:
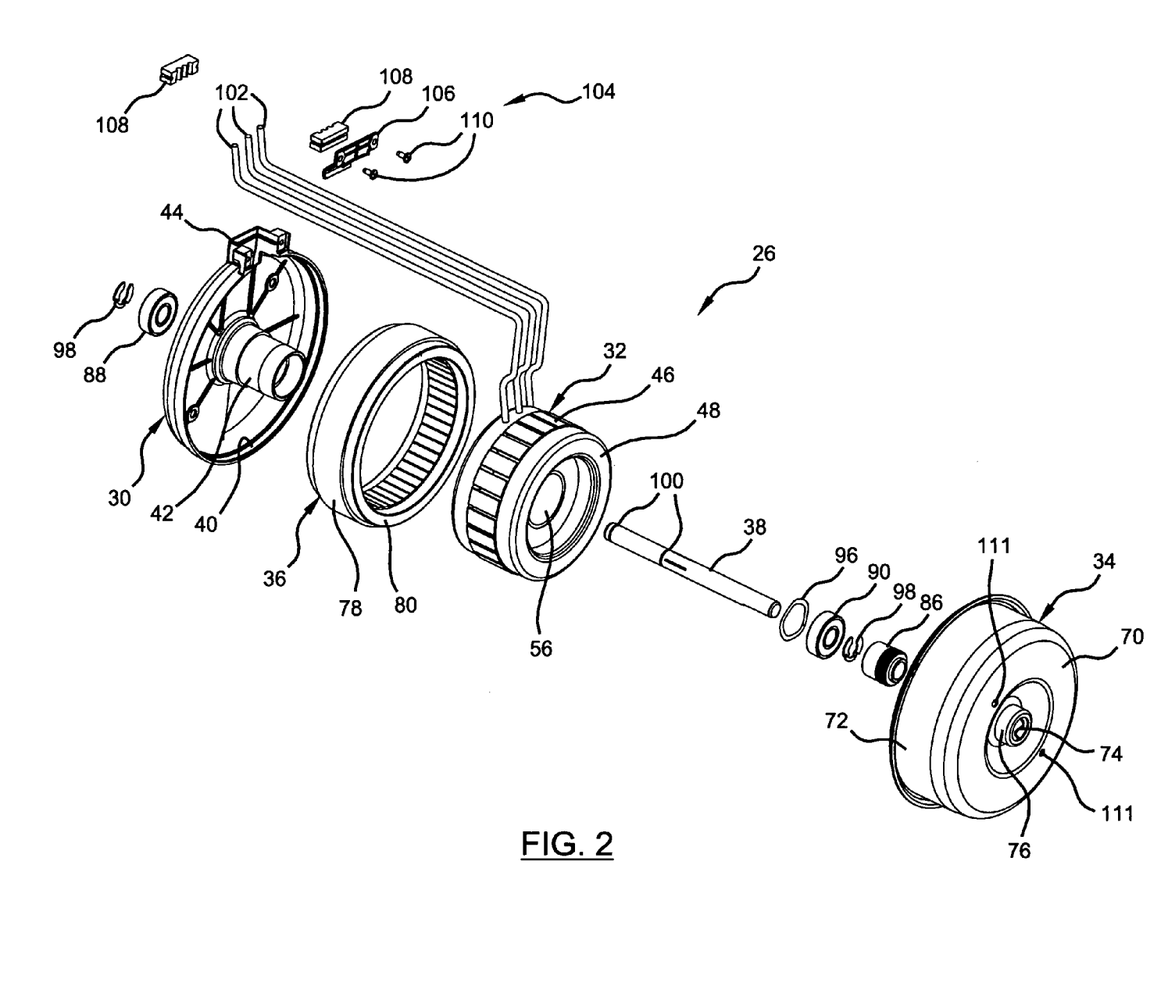
FIG. 2 is an exploded view of the low profile electric motor.
Figure 3:
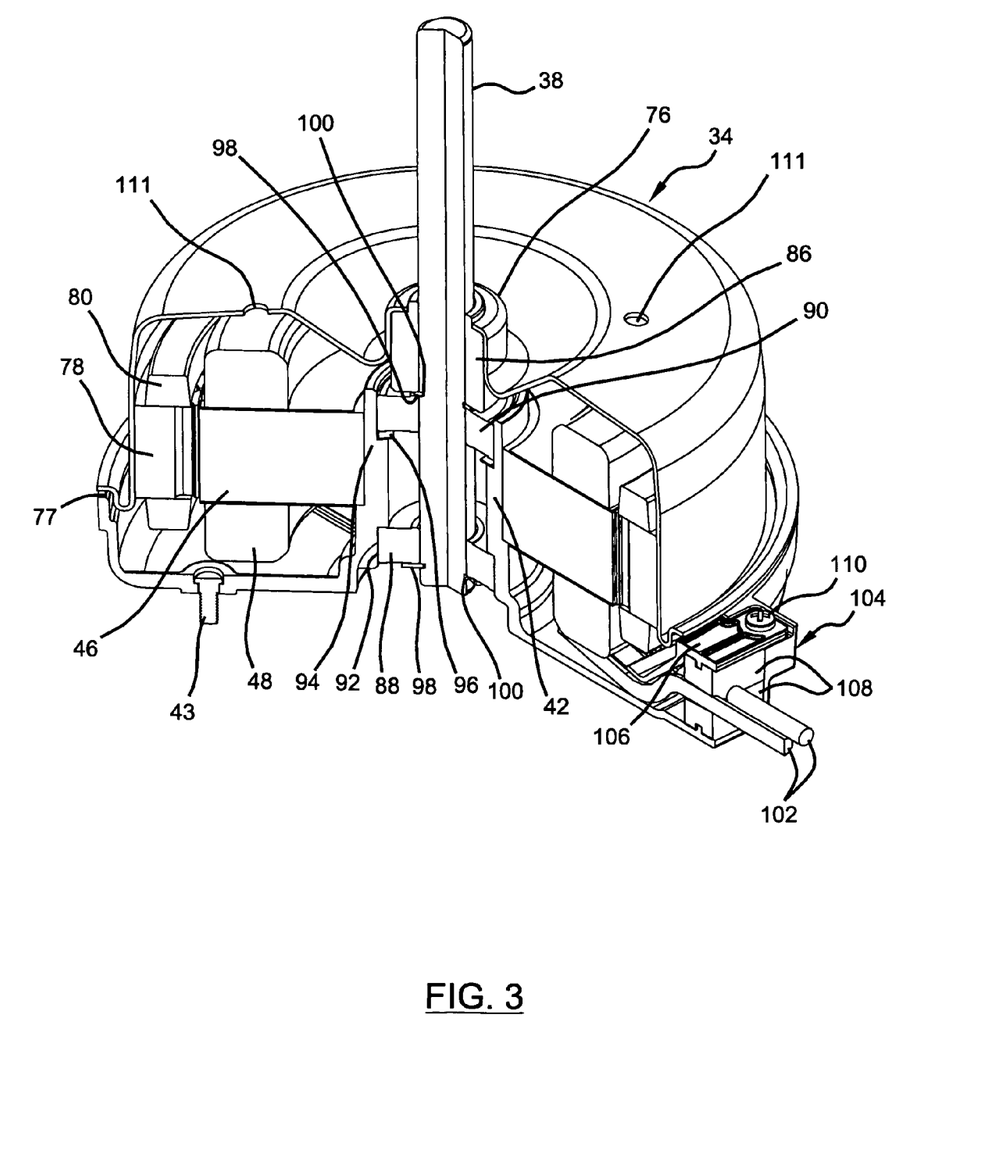
FIG. 3 is a partial cross-section of the low profile electric motor.
Figure 4:
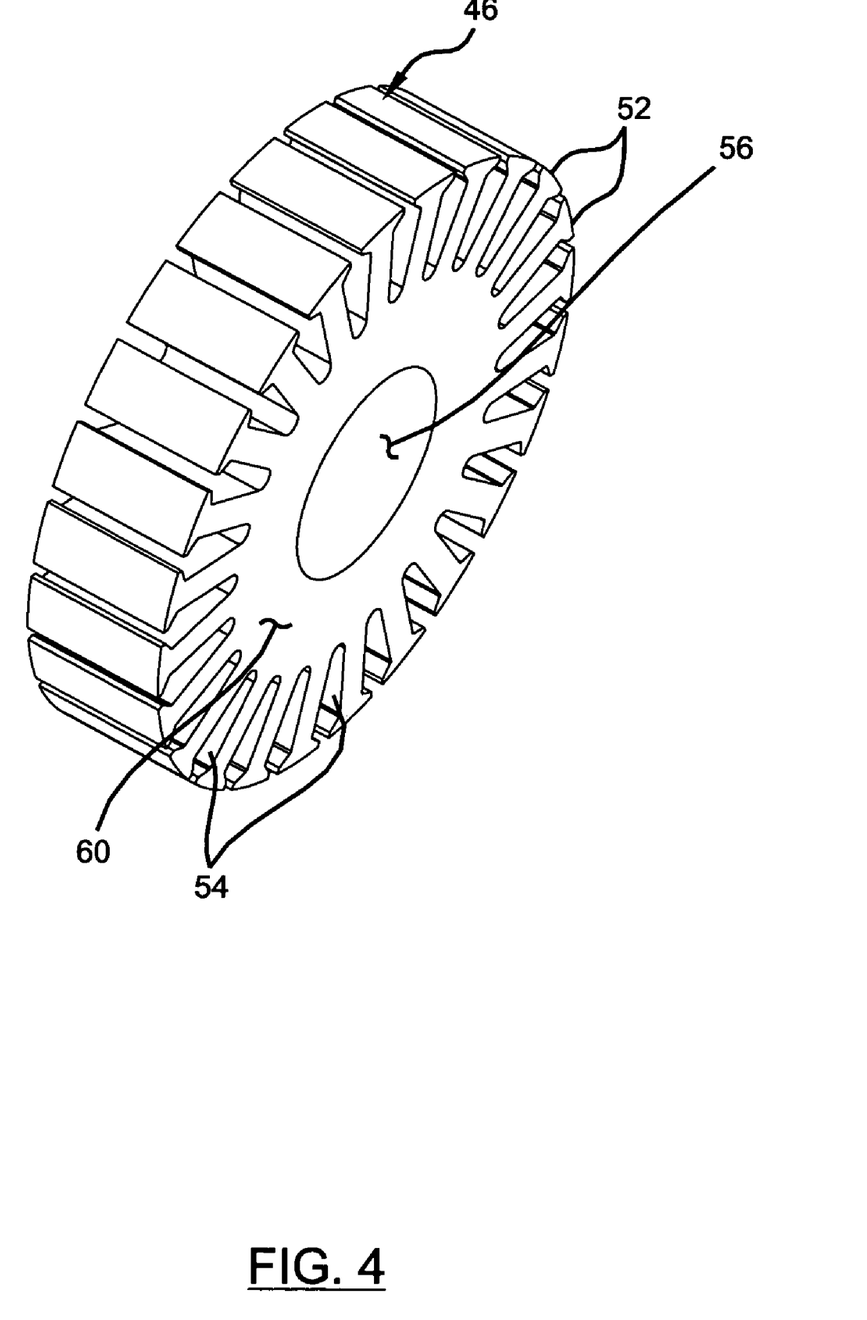
FIG. 4 is a perspective view of an internal stator laminate stack of the low profile electric motor.

The stator housing 30 includes a saucer-shaped body 40 having a stem 42 extending therefrom. The low profile electric motor 26 is attached to the top 22 by fasteners 43 that are received through the stator housing 30. A bracket 44 is integrally formed in a wall of the saucer-shaped body 40. The stator assembly 32 includes a laminate stack 46 having stator windings 48 wound thereabout. The laminate stack 46 includes a plurality of stator laminates that define stator teeth 52, slots 54 and a central aperture 56. The stator teeth 52 extend in a radially outward direction.

The laminate stack 46 is insulated by a heat set plastic powder coating that covers a face 60 of the laminate structure and the stator slots 54. The stator windings 48 are wound about laminate stack 46 through the slots 54 and about the stator teeth 52. The stator windings 48 are wound to define the poles of the low profile electric motor 26. The stator assembly 32 is mounted to the stator housing 30, whereby the stem 42 is received through the central aperture 56 and is attached thereto.

Figure 6:
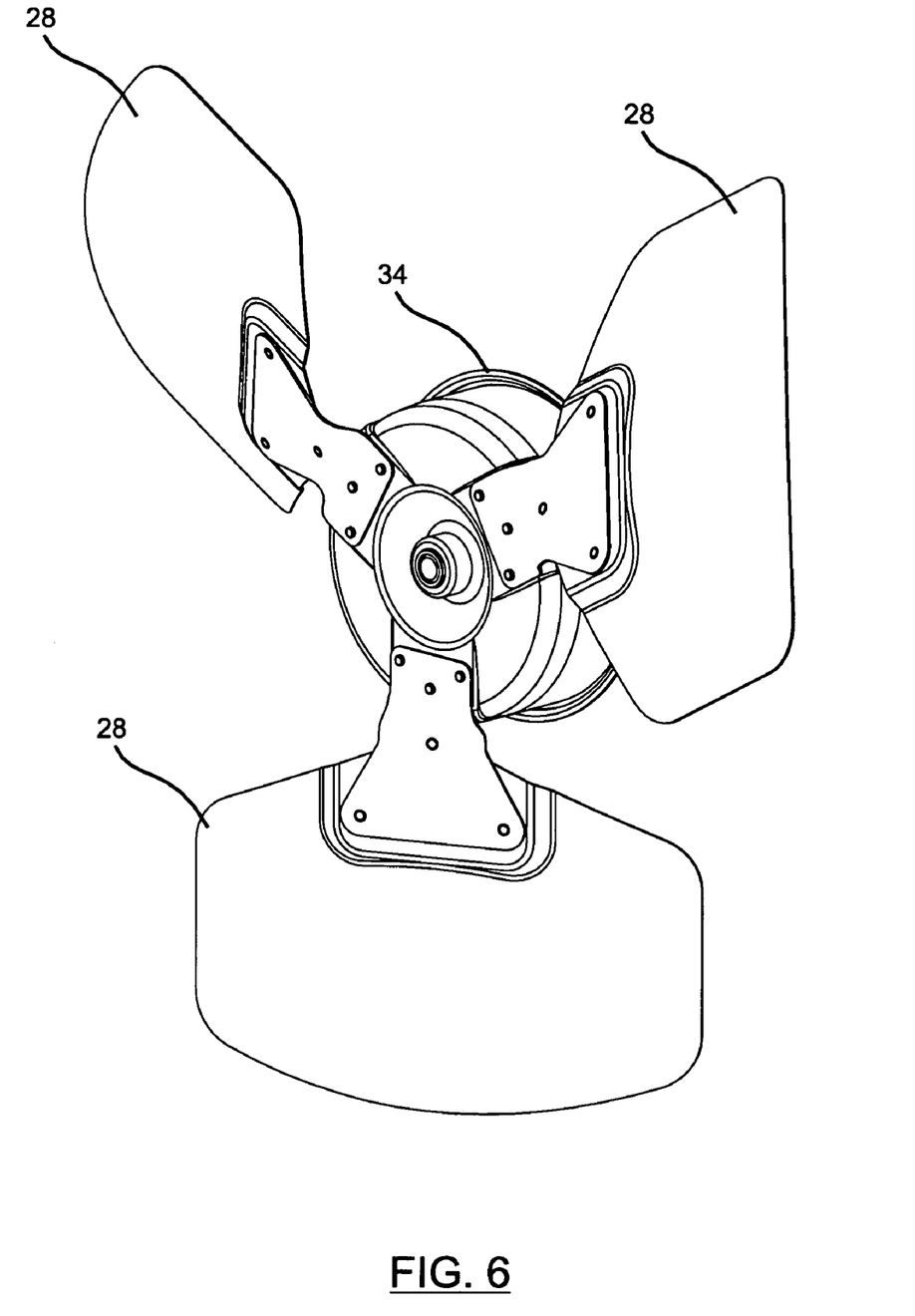
FIG. 6 is a perspective view of the external rotor housing or endshield having fan blades attached thereto.

The rotor housing 34 includes a bowl-shaped body 70 having a side wall 72 and a central aperture 74 in a relief 76 formed in the center of the rotor housing 34. The rotor housing 34 also includes a lip 77 formed about the perimeter of the side wall 72. The rotor assembly 36 is received into the rotor housing 34 and is attached to the side wall 72. The lip 77 is U-shaped and curves into and back out of the stator housing 30 to inhibit fluid seepage into the low profile electric motor 26. In this manner, a non-contact seal is provided to inhibit fluid flow into the low profile electric motor 26. Additionally, the rotor housing 34 is enclosed (i.e., does not include vents that would enable air flow into the low profile electric motor 26), to further prohibit fluid seepage into the low profile electric motor 26. Two drain holes 111 allow condesate water from environmental temperature changes to drain out from within the low profile electric motor 26.

Figure 5:
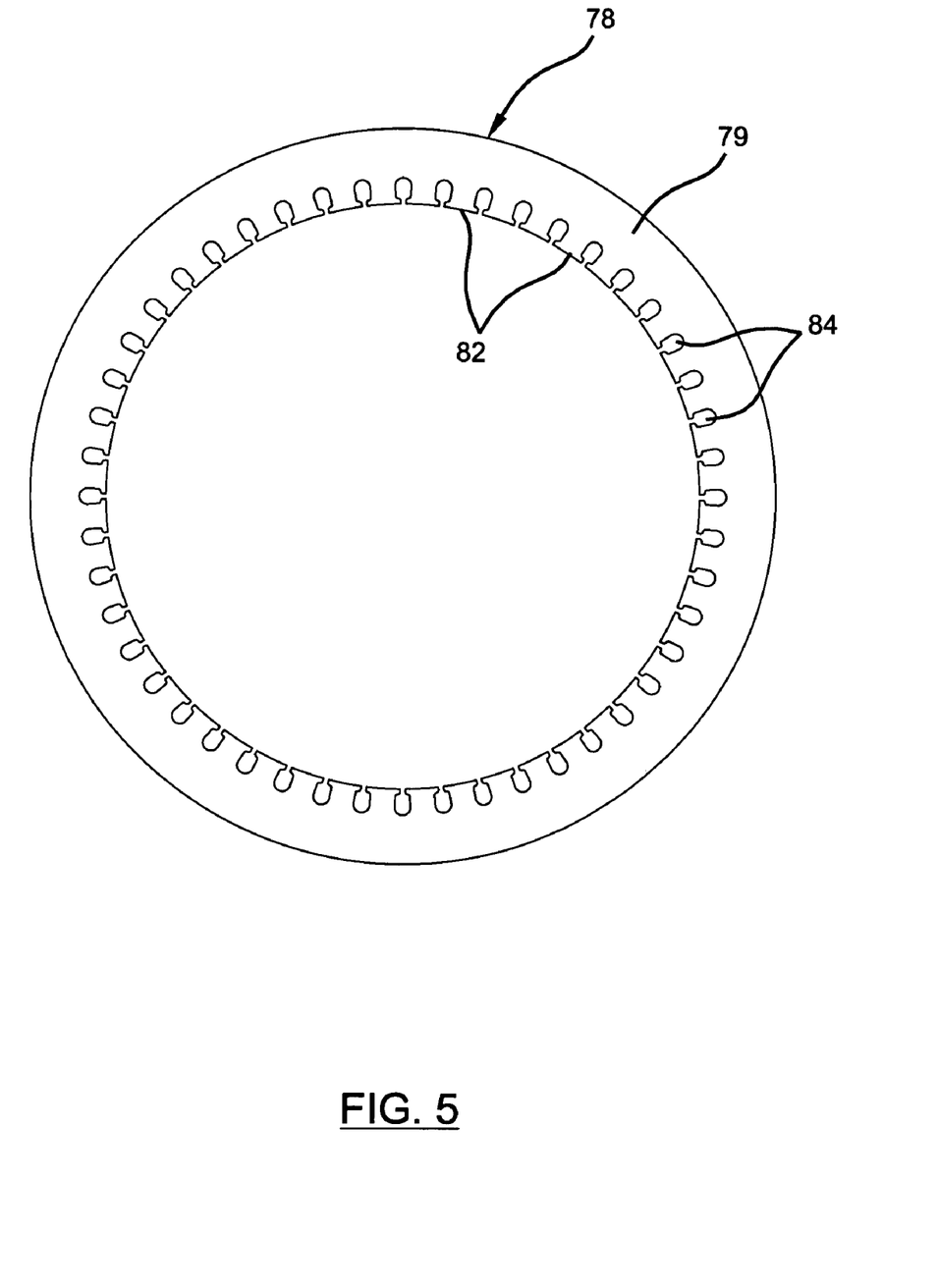
FIG. 5 is a top view of an external rotor laminate stack of the low profile electric motor.

The rotor assembly 36 includes a laminate stack 78 that is schematically illustrated. The laminate stack 78 includes a plurality of indexed rotor laminates 79 that define rotor teeth 82 and bores 84. Aluminum filled rotor bars 80 are schematically illustrated and are positioned through the bores 84. Each laminate 79 in the stack 78 is rotated either 90 or 120 degrees plus rotor bar slot skew. Slot skew is a skewing or twisting of the bores 84. As a result of slot skew, when a rotor tooth 82 is aligned with a stator tooth 52 on one side of the electric motor 26, they are misaligned on the other side of the electric motor 26.

The shaft 38 is fixed for rotation with the rotor housing 34 and extends through the central aperture 56 of the stator housing 30 and the central aperture 74 of the rotor housing 34. A collar 86 is press-fit into a space defined by the relief 76 and is fixedly attached to both the shaft 38 and the rotor housing 34. The rotor housing 34 is driven by the shaft 38 using a single contact (i.e, the collar 86). The shaft 38 is rotatably supported by bearings 88, 90 that seat within cavities 92, 94 of the stem 42, respectively. A spring washer 96 is disposed between the bearing 90 and a face of the cavity 94 to take up tolerances between the components. Circlips 98 are received about grooves 100 formed in the shaft 38 to retain the bearings 88, 90 within the grooves 92, 94. More specifically, the circlips 98 sandwich the bearings 88, 90 within the stem 42 to prevent disassembly of the shaft 38 from the stem 42.

A series of electrical conductors define the stator windings 48. More particularly, magnet wire in the form of main and auxiliary coils are wound or inserted around the stator teeth 52 to define the poles of the low profile electric motor 26. Leads 102 of each of the electrical conductors extend from a guide bracket 104. The guide bracket 104 includes the bracket 44 of the stator housing 30, a bracket cover 106 and spacers 108. The spacers 108 hold the leads 102 and are sandwiched between the bracket 44 and the bracket cover 106. The bracket cover 106 is fixed to the bracket 44 with fasteners 110. It is also anticipated that the electric motor 26 can be leadless. The leadless electric motor 26 includes a plug (not shown) that provides an electrical path to the stator windings 48. A power supply (not shown) includes a mating plug to provide power to the electric motor 26.

In operation, current flows through the stator windings 48 to induce a magnetic stator field. The stator field induces current flow in the aluminum filled rotor bars 80 to create a magnetic rotor field. The rotor field attempts to align itself with the stator field. Because the stator field pulses, the rotor field chases the pulsing stator field. As a result, the rotor assembly 36 and rotor housing 34 rotate about the stator assembly 32. The shaft 38 is accordingly induced to rotate as it is fixed for rotation with the rotor housing 34. The rotating shaft 38 drives the fan 28, which is attached thereto.

The low profile electric motor 26 preferably includes six-poles. The stator windings 48 are wound on the stator to create poles. The speed of the pulsing magnetic field or synchronous speed is 1200 RPM when 6 poles are used with 120V/60 Hz. The synchronous speed is determined by multiplying the frequency by 120 and dividing by the number of poles (e.g., {[120×60 Hz]/6 poles}=1200 RPM). The actual operating speed of the low profile electric motor 26 is approximately 5 percent less than the synchronous speed (i.e., approximately 1100 RPM in this implementation).

Although FIG. 1 illustrates the fan 28 attached to the shaft 38, it is anticipated that alternative fan configurations can be employed. For example, the fan blades can be directly attached to and radially extend from the rotor housing 34 (see FIG. 6). In this case, the shaft 38 can be shorter such that it does not extend a significant distance past the collar 86. In this manner, the upper portion (X) becomes smaller and the condenser efficiency is further increased. Alternatively, the height of the condensing unit 12 can be decreased by the clearance provided by moving the fan blades upward.

The low profile electric motor of the present invention provides specific advantages over electric motors traditionally implemented in condensing units. The low profile electric motor allows the fan to be located higher in the condensing unit, which more efficiently draws air over the coils located near the top of the condensing unit. The external rotor configuration the low profile electric motor dissipates less power than inner rotor PSC motors. A power reduction of approximately 10% as compared to conventional condensing unit motors has been achieved. The external rotor configuration also provides an improved acoustic noise profile over traditionally implemented electric motors. The low profile electric motor reduces acoustic noise of one or more decibels (dB) over about 75% of the audible frequency range as compared to conventional condensing unit motors.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A condensing unit for an air conditioning (A/C) system, comprising:
   a condensing coil;
   a fan including fan blades;
   an electric motor that rotates said fan to induce air flow through said condensing coil, wherein said electric motor comprises:
   a stator assembly;

a rotor assembly that rotates radially outside of said stator assembly;

a rotor endshield that is attached to and rotates with said rotor assembly, wherein said fan is connected to said rotor endshield; and a stator housing, wherein said rotor endshield forms a non-contact seal with said stator housing.

2. The condensing unit of claim 1 wherein said stator assembly includes single-phase windings.

3. The condensing unit of claim 2 wherein said single-phase windings define 6 poles.

4. The condensing unit of claim 1 wherein said rotor assembly includes rotor bars.

5. The condensing unit of claim 1 wherein said one of said fan and said fan blades are connected to said rotor endshield.

6. The condensing unit of claim 1 wherein said rotor endshield is enclosed and includes drain holes.

7. A condensing unit for an air conditioning (A/C) system, comprising:

a condensing coil;

a fan including fan blades; and an electric motor that rotates said fan to induce air flow through said condensing coil, wherein said electric motor comprises:

an internal stator assembly;

an external rotor assembly rotatable about said internal stator assembly;

a shaft that rotates with said external rotor assembly and that is connected to said fan;

a rotor endshield that is attached to and rotates with said external rotor assembly, wherein said fan is connected to said rotor endshield; and a stator housing, wherein said rotor endshield forms a non-contact seal with said stator housing.

8. The condensing unit of claim 7 wherein said internal stator assembly includes single-phase windings.

9. The condensing unit of claim 8 wherein said single-phase windings define 6 poles.

10. The condensing unit of claim 7 wherein said external rotor assembly includes rotor bars.

11. The condensing unit of claim 7 further comprising:

bearings having an outer race that contacts said internal stator assembly and an inner race that contacts said shaft; and a collar that connects said shaft and said rotor endshield.

12. The condensing unit of claim 7 wherein said rotor endshield is enclosed and includes drain holes.

13. A condensing unit for an air conditioning (A/C) system, comprising:

a condensing coil;

a fan; and an electric motor that rotates said fan to induce air flow through said condensing coil, wherein said electric motor, comprises:

an internal stator assembly including a stator housing; and an external rotor assembly that rotates relative to said internal stator assembly and that includes an enclosed rotor endshield having a radial edge that forms a non-contact seal with a corresponding edge of said stator housing.

14. The condensing unit of claim 13 wherein said internal stator assembly includes single-phase windings.

15. The condensing unit of claim 14 wherein said single-phase windings define 6 poles.

16. The condensing unit of claim 13 wherein said external rotor assembly includes rotor bars.

17. The condensing unit of claim 13 wherein said fan is connected to said enclosed rotor endshield.

18. The condensing unit of claim 17 wherein said fan comprises a plurality of fan blades.

19. The condensing unit of claim 13 wherein a shaft is fixed for rotation with and extends from said enclosed rotor endshield.

20. The condensing unit of claim 13 wherein said fan is attached to said shaft.

* * * * *